United States Patent [19]

Konczal

[11] 4,002,185
[45] Jan. 11, 1977

[54] MOTOR OPERATED VALVE UNIT WITH HEAT DISSIPATING CLIP MEMBER

[75] Inventor: Harry C. Konczal, Milwaukee, Wis.

[73] Assignee: Erie Manufacturing Company, Milwaukee, Wis.

[22] Filed: Oct. 24, 1975

[21] Appl. No.: 625,633

[52] U.S. Cl. .............................. 137/338; 251/133; 310/64
[51] Int. Cl.² ........................................ F16K 49/00
[58] Field of Search .................. 251/133; 137/338; 310/64, 65

[56] References Cited
UNITED STATES PATENTS

| | | | |
|---|---|---|---|
| 2,491,943 | 12/1949 | Abbott | 310/64 |
| 3,248,080 | 4/1966 | Plasko | 251/133 X |

Primary Examiner—Arnold Rosenthal
Attorney, Agent, or Firm—Michael, Best & Friedrich

[57] ABSTRACT

A motor operated valve unit including a fluid valve driven by an electric motor through a suitable drive mechanism, and a heat dissipating clip member comprised of a horizontal gripping portion and a pair of depending flange portions formed integrally therewith. The gripping portion is provided with a circular gripping edge which extends slightly over 180° from tip to tip. The clip member is snapped into a groove on the electric motor and is dimensioned so that the flanges thereon will be in snug contact with the inside surface of a removable cover member.

6 Claims, 4 Drawing Figures

MOTOR OPERATED VALVE UNIT WITH HEAT DISSIPATING CLIP MEMBER

BACKGROUND OF THE INVENTION

I. Field of the Invention

This invention relates to a motor operated valve unit equipped with a specially designed heat dissipating clip member which functions to effectively dissipate heat generated by the motor into the surrounding atmosphere.

II. Description of the Prior Art

The specially designed heat dissipating clip member of the present invention is designed to provide a simple yet effective means for dissipating the heat from the electric motor of a motor operated valve and to accomplish this function without any substantial redesign of the motor operated valve unit.

SUMMARY OF THE INVENTION

A fluid operated valve unit including a fluid valve and electric motor for actuating the valve and a drive mechanism mounted between the valve unit and the motor to operatively connect the motor to the valve. The motor operated valve unit is also provided with an enclosure means for the electric motor and drive mechanism which is comprised of a mounting bracket and a cover member. A heat dissipating member of metal material is provided and has a first portion thereof positioned in contact with the motor and a second portion thereof positioned in contact with the cover member, such heat dissipating member serving to conduct heat from the motor to the cover member.

DESCRIPTION OF THE PREFERRED EMBODIMENT

Figure 1:
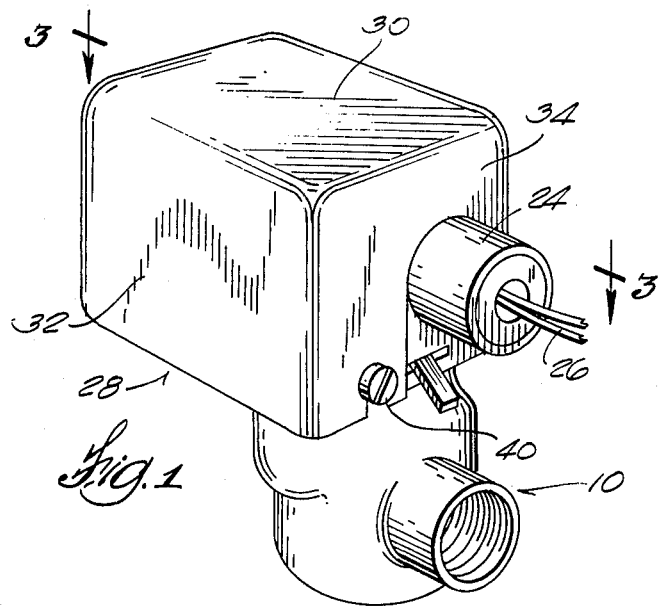
FIG. 1 is a perspective view of a motor operated valve equipped with a heat dissipating member made in accordance with the present invention.

The motor operated valve of the present invention is comprised of a fluid valve unit 10 driven by an electric motor 12 through a suitable drive mechanism 14. Motor 10 and drive mechanism 14 are mounted on valve unit 12 by means of a metal mounting bracket 18 and a plurality of mounting screws 20. Bracket 18 has an upstanding flange 22 thereon on which is mounted an insulated collar member 24 through which the electrical wiring 26 for the motor 12 extends. Since the internal structure of valve 10, motor 12 and drive mechanism 14 is not a part of the present invention, such structure will not be described in detail herein.

A removable cover member 28 comprising a top 30 and depending sidewalls 32, 34, 36, 38 is provided. The cover member 28, when installed as shown in FIG. 1, cooperates with bracket 28 to enclose motor 12 and drive mechanism 14. Cover 28 is held securely on bracket 18 by a screw 40.

Figure 4:
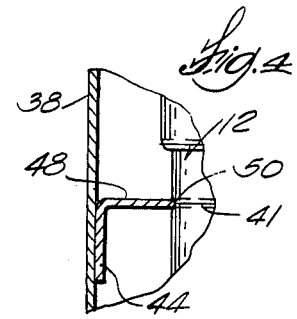
FIG. 4 is a fragmentary sectional view taken along line 4—4 of FIG. 3.

As best shown in FIG. 4, there is a groove 41 provided at the juncture between motor 12 and drive mechanism 14, one function of which will be described in detail hereinafter.

In many installations of a motor operated valve like that described above, it is important that the heat generated by motor 12, as it is energized to actuate valve 10 through drive mechanism 14, be dissipated to the surrounding atmosphere as rapidly as possible to thereby maintain temperatures at the motor operated valve below a predetermined maximum. In the present invention such heat dissipation is effectively accomplished by the use of a specially designed heat dissipating clip member 42.

In the preferred embodiment heat dissipating member 42 is made in the form of an aluminum stamping and is comprised of a horizontal gripping portion 44 and a pair of depending flange potions 46 and 48 integrally formed with portion 44.

Gripping portion 44 of member 42 is provided with a circular gripping and heat transfer edge 50. The circular edge 50 extends slightly over 180° from rounded tip 52 at one end thereof to rounded tip 54 at the other end thereof.

Figure 3:
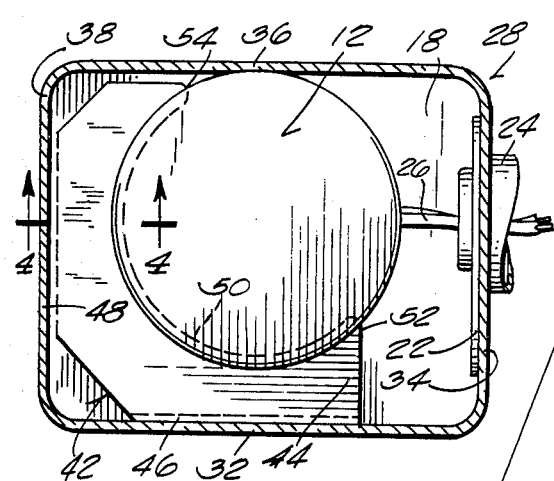
FIG. 3 is a horizontal sectional view taken along line 3—3 of FIG. 1.
Figure 2:
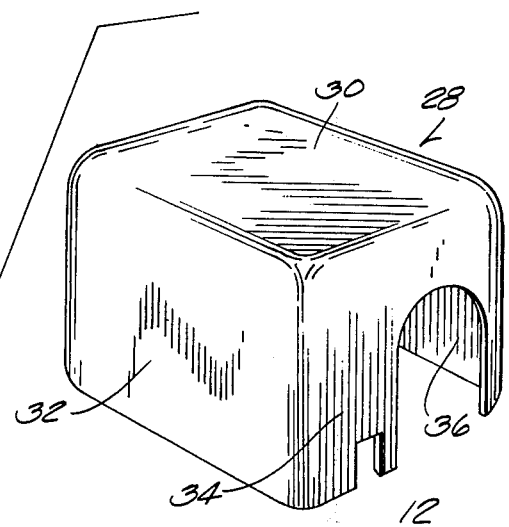
FIG. 2 is an exploded perspective view of the motor operated valve shown in FIG. 1.
Figure 2:
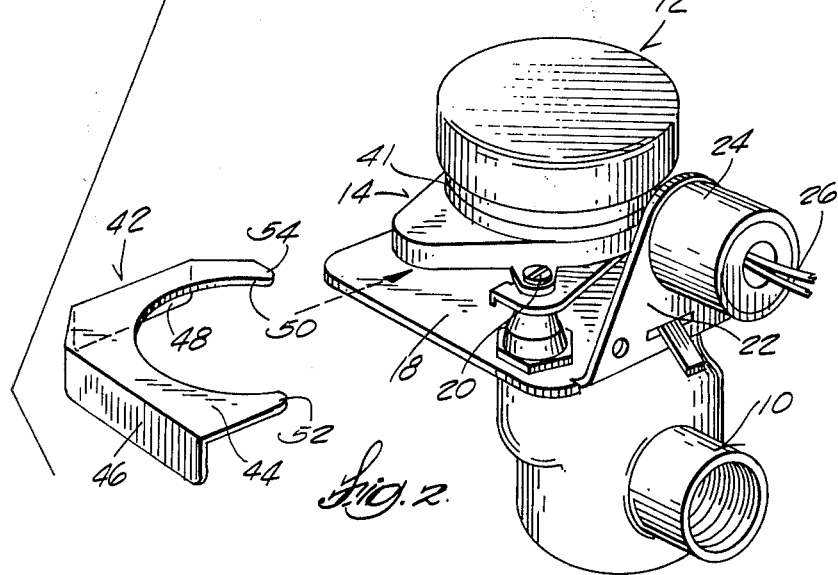

To install clip member in operative heat dissipating position the member is snapped into groove 41 as shown by the dotted arrow in FIG. 2. The diameter of curved edge 50 is dimensioned to conform to the diameter of groove 41. As indicated previously, the edge 50 from tip 52 to tip 54 extends slightly over 180° so that the clip member 42 can be snapped into groove 41 and retained therein as shown in FIG. 1. As best shown in FIGS. 3 and 4, with clip member 42 installed in groove 41 and with cover member 28 installed on the unit and fastened to a bracket 18, the clip member 42 is dimensioned so that the flanges 46 and 48 thereon will be in snug contact with the inside surface of depending sidewalls 32 and 38 of the cover member.

Thus, with the parts in operative position as described above, the heat generated by operation of motor 12 (which tends to be the greatest at the base of the motor in the area of groove 41) will pass by conduction into clip member 42 along edge 50 and then through the portion 44 and flanges 46 and 48 of the clip into the cover member 28 for dissipation into the surrounding atmosphere. A simple yet very effective means for dissipating the heat from the motor is thus accomplished without any substantial redesign of the motor operated valve unit.

I claim:

1. A motor operated valve unit comprising:
   a fluid valve unit;
   an electric motor for actuating said valve unit;
   a drive mechanism mounted between said valve unit and said motor to operatively connect said motor to said valve unit;
   an enclosure means for said electric motor and drive mechanism comprising a mounting bracket and a cover member; and
   a heat dissipating member of metal material having a first portion thereof positioned in contact with said motor and a second portion thereof positioned in contact with said cover member, said first portion of said heat dissipating member including a curved edge having a diameter which conforms to the outside diameter of said motor and is in contact therewith, said heat dissipating member serving to conduct heat from said motor to said cover member.

2. A motor operated valve unit according to claim 1 in which said curved edge is cicular and extends slightly over 180° from one end thereof to the other end thereof.

3. A motor operated valve unit according to claim 2 in which the ends of said curved surface are rounded.

4. A motor operated valve unit according to claim 3 in which said motor has a circular groove on the exterior thereof in which said curved edge of said heat dissipating member is mounted.

5. A motor operated valve unit according to claim 1 in which said second portion of said heat dissipating member is comprised of at least one flange on said heat dissipating member with the face thereof in contact with the inside surface of said cover member.

6. A motor operated valve unit according to claim 5 in which said heat dissipating member is in the form of an aluminum stamping.

* * * * *

PO-1050
(5/69)

UNITED STATES PATENT OFFICE
CERTIFICATE OF CORRECTION

Patent No. 4,002,185            Dated January 11, 1977

Inventor(s) HARRY C. KONCZAL

It is certified that error appears in the above-identified patent and that said Letters Patent are hereby corrected as shown below:

Column 2, line 16, change "potions"

to --portions--.

Column 3, line 2, change "cicular"

to --circular--.

Signed and Sealed this

Fifteenth Day of March 1977

[SEAL]

Attest:

RUTH C. MASON
*Attesting Officer*

C. MARSHALL DANN
*Commissioner of Patents and Trademarks*